April 11, 1939.　　　　I. G. EKLUND　　　　2,154,154
MOTOR VEHICLE FRAME
Filed June 29, 1936　　　2 Sheets-Sheet 1
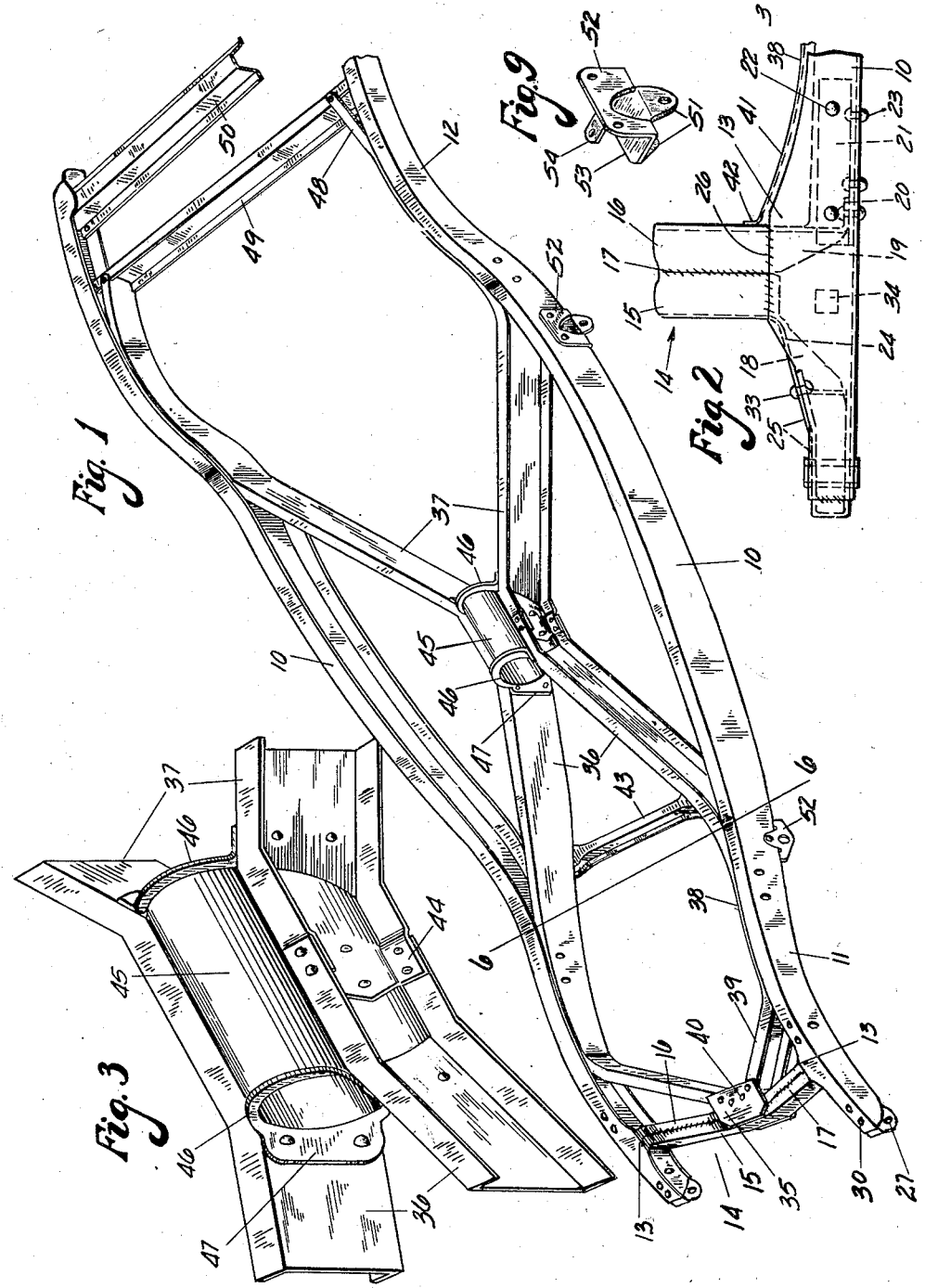
INVENTOR
IVAR G. EKLUND
BY
ATTORNEY April 11, 1939.     I. G. EKLUND     2,154,154
MOTOR VEHICLE FRAME
Filed June 29, 1936     2 Sheets-Sheet 2
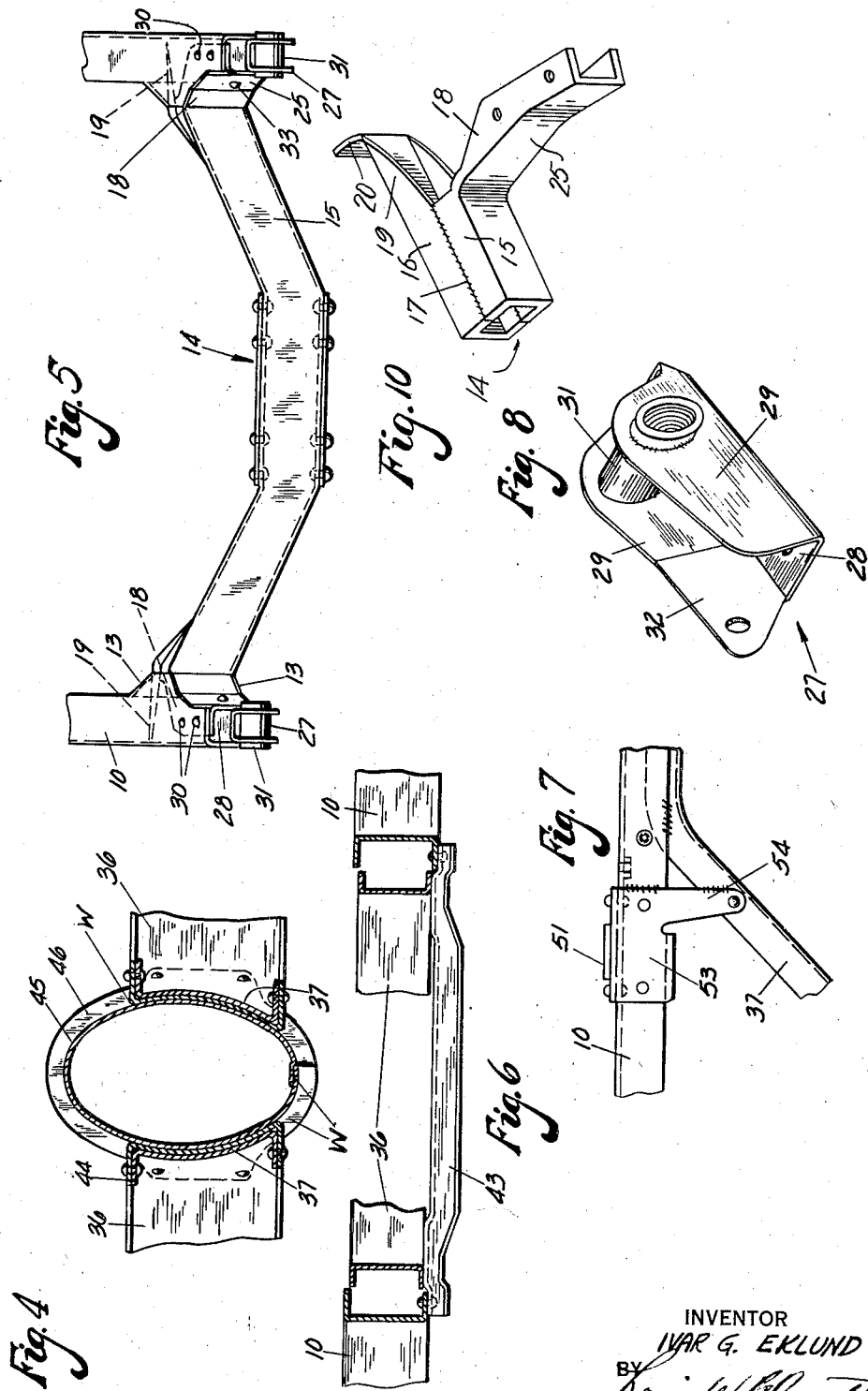
INVENTOR
IVAR G. EKLUND
BY
ATTORNEY Patented Apr. 11, 1939

2,154,154

UNITED STATES PATENT OFFICE 2,154,154

MOTOR VEHICLE FRAME

Ivar G. Eklund, Detroit, Mich., assignor to Midland Steel Products Company, Cleveland, Ohio, a corporation of Ohio Application June 29, 1936, Serial No. 87,833

2 Claims. (Cl. 280—106)

This invention relates to new and useful improvements in motor vehicle frames.

An important object of the invention is to provide an improved and more rigid construction for the forward end of the frame to withstand the stresses imposed thereon by independently sprung front wheels, side sway eliminators, spring hangers, shock absorbers and other adjuncts.

Another object of the invention is to provide an improved construction over the rear kickups of the frame where the side rails are diminished in depth over the mid-section of the rail.

Other objects and advantages will become apparent during the course of the following description.

In the accompanying drawings forming a part of the application wherein like numerals are employed to designate like parts throughout the several views.

Fig. 1 is a perspective view of the improved frame,

Fig. 2 is an enlarged top plan of one forward corner of the frame showing the construction of the ends of the front cross member and the means for attaching it to the side rails, Fig. 3 is an enlarged perspective view of the intersection of the X-member, Fig. 4 is a transverse vertical section of the same, Fig. 5 is a front elevation of the forward end of the frame showing the improved front cross member attached to the two side rails, Fig. 6 is a transverse section of the frame taken approximately on the line 6—6 of Fig. 1, Fig. 7 is an enlarged fragmentary plan of the bracket employed as a combined spring hanger and gusset construction between the side rail and the arms of the X-member.

Fig. 8 is an enlarged perspective view of the insert in the forward end of each side rail, Fig. 9 is a perspective view of one of the combined spring hangers and gussets shown in Fig. 7, Fig. 10 is an enlarged perspective view showing one end of the front cross member.

Referring now more in detail to the drawings, the numeral 10 designates a pair of channel-shaped side rails for the frame having the channels thereof facing inwardly as illustrated. Each of these rails is provided with a front kickup 11 and a rear kickup 12. Adjacent the extreme forward ends of each side rail, the upper and lower flanges thereof are provided with inwardly extending projections 13 in substantially the same plane with the respective flanges from which they extend.

The forward transverse cross member 14 is composed of a pair of oppositely facing channel sections 15 and 16 having their flanges extending toward one another in the same plane and butt or flash welded together along their longitudinal edges as at 17. This cross member may be of the drop type with its intermediate portions offset downwardly of the frame as shown in Figs. 1 and 5 or it may be a perfectly straight cross member arranged in substantially the same plane as the side rails with only a slight drop. The ends 18 and 19 of the front cross member are separated as best seen in Fig. 2. The ends 19 of the channel section 16 continue in the plane of the web portion thereof to extend all the way into and across the channels of the side rails 10 and between the projections or extensions 13 to terminate in angular flanges 20 formed by bending the web of section 16 at substantially right angles for attachment by rivets or otherwise to either the vertical web of the side rail or to the web portion of a channel-shaped reinforcement 21 having its two flanges secured to the upper and lower flanges of the side rail by rivets 22 and its web portion fastened to the web of the side rail by the rivets 23.

The other section 15 of the forward cross member has each end 18 bent at an obtuse angle as at 24 so that the web portion thereof at the bend extends slightly into the space between the extensions 13 of the side rail to be welded or otherwise suitably secured thereto near its edges to form the same into box section. The forward extremities 25 of these ends 18 are bent to follow the edges of the extensions 13 and the forward ends of the side rails to be nested within the channels of the rail and to be welded at the contiguous edges so that the extreme forward ends of the side rail are thus formed into a box or closed section. From the illustration in Fig. 2 it will be clear that the channel-shaped ends 18 and 19 of the cross member are nested wholly within the channels of the side rails and have their upper and lower flanges in contact with the inner surfaces of the upper and lower flanges of the side rail. It will also be apparent from this figure that the box section ends of the front cross member 14, before they separate into the ends 18 and 19 extend between the extensions 13 and are welded as at 26 to the edges of these extensions.

In order to provide a simple and inexpensive front spring hanger, and to further reinforce the extreme front box section ends of the rails, a channel-shaped stamping, shown best in Fig. 8 and designated by the numeral 27 is inserted in inverted fashion into the forward box section end of each rail with its upper web portion 28 engaging the inner surface of the upper flange of extension 25 so that rivets 30 fasten this spring hanger mounting 27 and the flanges of extremities 25 of the front cross member to the flanges of the side rails.

The forward end of stamping 27 extends beyond the extreme forward end of each side rail so that a sleeve or bushing 31 may extend through the flanges 29 to be welded thereto in forming the front hanger of each front spring. The inside vertical flange 29 of each stamping 27 is deflected inwardly slightly as at 32 to conform to the angle of the adjacent portion 25 for riveting thereto as at 33. This construction completely boxes in the forward extremities of both side rails and therefore provides a very rigid construction for the attachment of the forward hanger of the front spring of the vehicle and a rigid construction for the attachment of radiator, motor, shock absorbers and side sway eliminators by means of reinforcements 21 and attaching means 34. The radiator and motor may be attached to the bracket or plates 35 secured to the top and bottom of the forward cross member, or separate motor brackets may be attached to parts to be presently described.

The X-shaped cross member provided in this frame includes two forwardly diverging channel-shaped arms 36 and a pair of similar rearwardly diverging arms 37. These arms are positioned with their channels facing outwardly as illustrated and the forward arms extend to the two side rails 10 at a point in the vicinity of the dash line from which point they are continued forwardly to nest within the channels of the side rails and to have their flanges welded or otherwise secured to the flanges of the side rails as at 38. In Fig. 1 of the drawings, the forward ends of these arms 36 are bent inwardly as at 39 with their free ends secured between the plates 35 by means of the rivets. In the forms of invention shown in Fig. 2, these arms 38 as indicated by the numeral 41 extend all the way forward along the rail to the forward cross member to box in the entire forward ends of the side rail. The forward extremities of the portions 41 are formed into inwardly extending flanges 42 to be welded or otherwise suitably secured directly to the back of the forward cross member. As will be noted from Fig. 2, the ends 41 of the arms 38 are made wider and are nested in the channels of the rails in contact with the extensions 13 whereby the edges of the latter may be welded to the flanges of the arms. The forward arms 36 of the X-member are connected together at points where they begin to converge rearwardly by means of a transverse cross member 43 which is of inverted channel-shaped section with the edges of their flanges terminating in lateral flanges. If desired, the ends of the cross member 43 may be extended on under the arms 36 to be fastened to the bottom flanges of both the arms 36 and the side rails.

As best appreciated from Fig. 3, the ends of the arms 37 adjacent the intersection of the X-member are slightly offset as at 44 to snugly nest within the adjacent ends of the arms 36 to be riveted thereto as shown.

These overlapping ends of the two sets of arms are secured together in X formation by means of a housing 45 of substantially oval or elliptic section, the major axis of the ellipse or oval being disposed vertically to provide ample clearance for the propeller shaft of the vehicle. The two ends of the housing 45 are flanged as at 46 and these flanges are provided with angular extensions 47 which are adapted to fit the converging web portion of the X-member arms to be riveted or otherwise suitably secured thereto. If desired, the flanges 46 with their extensions 47 may be formed from separate pieces and attached to the ends of the housing in any suitable manner.

The rear arms 37 of the X-member diverge rearwardly from the housing to meet the side rails 10 at a point ahead of the rear kickup portions 12 where these arms continue in parallel relation to the side rails to be nested within the channels thereof and fastened to the flanges of the rail in any suitable manner. The rear ends 48 of the arms 37 are turned inwardly away from the rail to be connected to a rear cross member 49 in spaced relationship to the side rails as shown. A second rear cross member 50 is provided for connecting the rearmost ends of the two rails together.

The rear hangers of the front springs and the front hangers of the rear springs are shown in detail in Figs. 7 and 9. These hangers also form gussets between the forward and rear arms of the X-member and the side rails as best appreciated from Fig. 7. These hangers are preferably formed from stampings having a pair of depending ears 51 for connection with the springs and one of which projections is cut out of a vertical flange portion 52 and turned downwardly as shown in Fig. 9. The other flange 53 of this L shaped hanger is provided with a lateral gusset extension 54 which, as shown in Fig. 7 bridges the crotch between the X-member arm and the side rail to rigidify the frame at this point.

It is to be understood that various changes in the shape, size and arrangement of parts may be resorted to without departing from the spirit of the invention or the scope of the appended claims.

I claim:

1. In an automobile frame, a pair of side rails having channel-shaped forward ends, a forward cross member spaced a distance rearwardly from the forward ends of the side rails and connecting the rails, each end of the cross member having a pair of arms, one of which extends into the channel of the side rail and is secured to the web thereof, and the other arm being extended at an angle forwardly of the rail to the end thereof to close the channel thereof and form the forward ends of the rails into closed box section forwardly of the cross member.

2. In an automobile frame, a pair of side rails having portions thereof formed into channel-section, a cross member spaced a distance rearwardly from the forward ends of the side rails and composed of two sections of oppositely facing channels, the ends of one section of the cross member being extended into the channels of the side rails and secured to the web portions thereof, and the other section of the cross member having its ends turned outwardly to substantially parallel the side rail to the end thereof and secured to the flanges thereof for forming portions of the side rail into closed box section forwardly of the cross member.

IVAR G. EKLUND.

CERTIFICATE OF CORRECTION.

Patent No. 2,154,154.  April 11, 1939.

IVAR G. EKLUND.

It is hereby certified that the name of the assignee in the above numbered patent was erroneously described and specified as "Midland Steel Products Company" whereas said name should have been described and specified as The Midland Steel Products Company, of Cleveland, Ohio, a corporation of Ohio, as shown by the record of assignments in this office; and that the said Letters Patent should be read with this correction therein that the same may conform to the record of the case in the Patent Office.

Signed and sealed this 16th day of May, A. D. 1939.

(Seal)

Henry Van Arsdale
Acting Commissioner of Patents.